Aug. 19, 1958  L. W. ATCHISON  2,847,834
HEATING AND COOLING ARRANGEMENT USING A HEAT PUMP
Filed Aug. 5, 1957
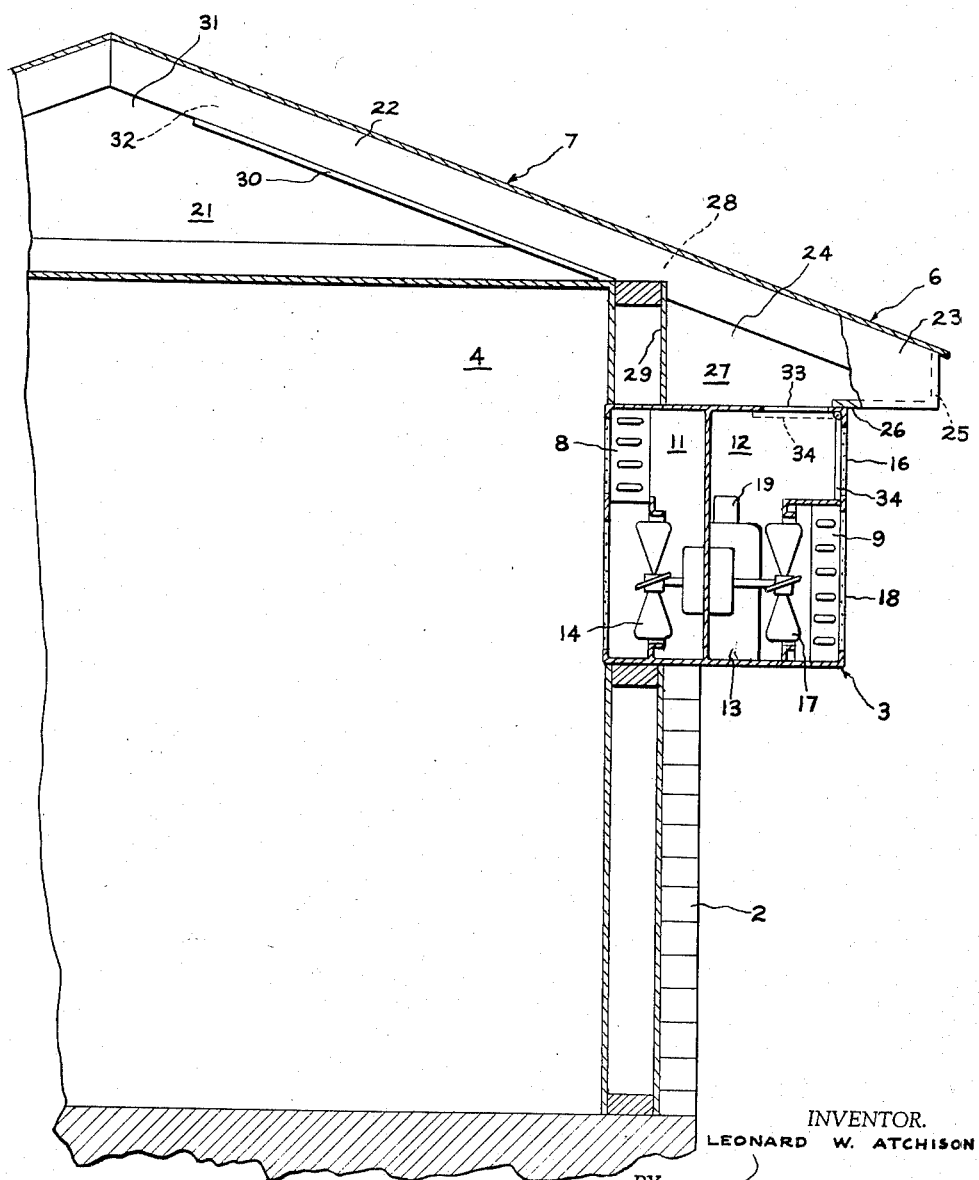
INVENTOR.
LEONARD W. ATCHISON
BY
HIS ATTORNEY United States Patent Office 2,847,834
Patented Aug. 19, 1958

2,847,834

HEATING AND COOLING ARRANGEMENT USING A HEAT PUMP

Leonard W. Atchison, Louisville, Ky., assignor to General Electric Company, a corporation of New York Application August 5, 1957, Serial No. 676,235

3 Claims. (Cl. 62—263)

The present invention relates to and has as its principal object a new and improved house heating and cooling arrangement which utilizes a heat pump which is so arranged that, during the heating operation of the home, it recaptures heat escaping from the house into the attic.

According to the present invention there is provided a house heating and cooling arrangement using a heat pump which is mounted in one of the outer walls of the house in the upper portion thereof adjacent the overhanging eaves of the roof. The heat pump contains a first inlet opening and an outlet opening by which outside air may be circulated through the heat pump. Side walls and a bottom wall, connected to the eaves of the house and extending to the heat pump, form a duct through which attic air may be distributed to the heat pump. A suitable opening leading between the rafters from the attic into the duct provides a convenient means for air to flow into the duct. A second inlet opening is provided in the heat pump leading into the duct whereby air within the duct flowing from the attic may be directed into the heat pump. A suitable means is provided for closing the first inlet opening to the heat pump during the winter and for closing the second heat pump opening into the duct during the summer in order to permit utilization of the air from the attic during the winter and outside air during the summer.

As a further aspect of the invention, there is attached to the rafters in the attic a bottom wall which extends part way up to the peak of the attic and thereby forms a duct leading to the upper portion of the attic whereby the relatively warmer air in this portion of the attic may be drawn downwardly to the heat pump.

For a better understanding of the invention reference may be had to the accompanying drawing, the single figure of which shows a cross-sectional elevation view of a house having the heating and cooling arrangement of the present invention.

Referring now to the drawing, there is shown a house in which there is mounted in an outer wall 2 thereof, a heat pump 3 which is designed to heat the enclosure 4 during the winter and provide cooling for the enclosure 4 during the summer. The heat pump is mounted in the upper portion of the wall 2 adjacent the eaves 6 which overhang the walls of the house and extend from the roof 7. In order to condition the enclosure 4 for both winter heating and summer cooling the heat pump is provided with a pair of heat exchangers 8 and 9 mounted respectively in inner and outer compartments 11 and 12. The heat exchangers are connected in refrigerant flow relationship with a compressor 13 which is also mounted in the outer compartment 12. Air is circulated from within the enclosure 4 through the inner compartment 11 by a fan 14 which circulates air through the lower portion of the compartment 11 and discharges it back into the enclosure 4 after passing it through the heat exchanger 8. Outside air is drawn by the fan 17 into the outer compartment 12 through the inlet opening 16 whereupon it flows downwardly through the heat exchanger 9 and is discharged through the outlet opening 18.

In order to provide heating in the winter and cooling in the summer, the heat pump is provided with a refrigerant flow reversing means 19 for reversing the flow of refrigerant to the heat exchangers such that, during the winter, the heat exchanger 8 operates as a condenser while the heat exchanger 9 operates as an evaporator, and, during the summer, the heat exchanger 8 operates as an evaporator while the heat exchanger 9 operates as a condenser. Thus air from the enclosure flowing through the inner compartment during the winter passes through the heat exchanger 8 and absorbs heat from this heat exchanger which is operating as a condenser. During the summer while the heat exchanger 8 is operating as an evaporator, the air circulated through the inner compartment 11 gives up heat and is cooled as it passes through this heat exchanger. Conversely, during the winter the heat exchanger 9 acts as an evaporator and absorbs heat from the air passing therethrough and during the summer it acts as a condenser thereupon giving up heat to the air passing therethrough.

As thus far described, however, the heat pump with its two separate compartments and heat exchangers forms no part of the present invention but is intended only to be illustrative of the type of heating and cooling device to which the present invention is best adapted. As will now be explained, the invention deals with the air ducting arrangement whereby heat escaping into the attic may be recaptured during the heating cycle of the heat pump.

During the heating of a house in the winter, one of the major causes of heat loss from the house is the heat flow through the ceiling of the house to the attic 21. The heat losses through the ceiling are such that, during the winter when the outdoor ambient reaches its lowest temperatures, the temperature in the attic of a house is normally 15° to 30° above that outside, depending upon the particular characteristics of the house and the insulation in the ceiling between the lower rooms and the attic. Heat also accumulates in the attic due to the solar heat produced by the sun's radiation upon the roof of the house, and during cold, sunny days this heat collecting within the attic raises the temperature of the air within the attic quite considerably.

In order to take advantage of the relatively higher air temperatures within the attic during the winter, and thereby to permit the absorption of a greater amount of heat from the air flowing over the heat exchanger 9, the present invention provides a convenient arrangement for ducting this attic air into the outer compartment 12 of the heat pump during winter when the heat exchanger 9 is being utilized as an evaporator. As will be hereinafter explained, this arrangement takes advantage of the natural ducting already present within the housing structure and provides an arrangement which may be cheaply and easily constructed for recapturing and regenerating this heat within the attic.

As stated above, the heat pump is mounted in the upper portion of the outer wall adjacent the eaves of the house. In the illustration, the heat pump is arranged such that the top of the heat pump is approximately level with the lowermost portion of the eaves. The adjacent rafters 22 (only one of which is shown) of the overhanging eaves 6 provide a convenient means whereby air may be directed downwardly from the attic to a conveniently located heat pump. In order to fully utilize this natural ducting between adjacent rafters which is already present in the housing structure, side walls 23, 24 and 25 have been attached to the rafters 22, and these side walls in conjunction with a bottom wall 26 form a duct 27 connecting with the heat pump 3. An opening 28 leading from the attic into the duct is formed by cutting the siding 29 between the eaves, or overhanging portion of the roof. In the illustrated arrangement of the invention, there is provided a bottom wall 30 which is attached to the underside of at least two adjacent rafters 22 and which extends from the floor of the attic part way up the rafters to a point where it forms an opening 35 leading to the upper portion of the attic. Thus, the rafters 22 and the bottom wall 30, along with the roof 7 form a natural passageway for air, which normally is the warmest in the upper portion 31 of the attic 21, to flow into the opening 32 and be conducted downwardly between the rafters 22, through the opening 28 and into the duct 27.

It should be noted that this natural ducting between the rafters 22 can be utilized without providing a bottom wall 30 to completely enclose the passageway since the warm upper air normally tends to flow in a path adjacent the roof and through its own propensity to rise will be maintained between the rafters 22. However, if the bottom wall 30 is provided, there is a greater flow of warm air from other areas all along the peak of the roof toward the opening 32 of the passageway thereby utilizing as much as possible all of the warmest air within the attic.

By means of a second inlet opening 33 in the top of the heat pump, air may be drawn into the heat pump through the duct 27. A suitable means is provided within the heat pump for closing off the first inlet opening 16 such that outside air may be prevented from entering the heat pump during its operation on the heating cycle. More specifically, there is found a hinged damper 34 which is arranged to close the opening 16 during the winter and arranged to pivot or swing across the upper portion of the heat pump and close the opening 33 during the summer. When the damper 34 is pivoted to close the inlet opening 16, the fan 17 causes air to flow from within the duct 27 into the outer compartment 12 of the heat pump instead of from the outside. Thus attic air is drawn through the duct 27 whereupon it passes into the heat pump through the second inlet opening 33 and flows downwardly through the heat exchanger 9 and finally is discharged from the heat pump through the outlet opening 18. This air flowing downwardly from the attic via the passageway between the rafters 22 and duct 27 over the heat exchanger 9, operating as an evaporator during the winter, transfers its heat to the refrigerant flowing through the system, whereupon this heat is delivered to the heat exchanger 8 through the compressor and is absorbed by the air circulating through the inner compartment 11 from the enclosure 4.

In the summer the damper 34 is pivoted to the illustrated dotted line position so that it closes off the second inlet opening 33 and opens the first inlet opening 16 to permit outside air to be circulated through the outer compartment 12 for cooling the heat exchanger 9 which which is then operated as a condenser. No means is shown for moving the damper into its two positions. However, the damper may be operated by a manually operable lever extending through the front of the unit or it may be operated electrically by other means, such as a motor, which is energized at the same time the refrigerant reversing means 19 is actuated to reverse the flow of refrigerant through the system. This operation would suitably coordinate the position of the damper 34 with the particular operation of the refrigerant system during either the summer or the winter.

By the present invention there is provided a new and improved house heating and cooling arrangement which permits the recapture of heat losses through the ceiling and heat produced by solar energy in the attic and which takes advantage of present housing structure to provide a convenient and easily constructed means for recapturing and making use of this heat.

While in accordance with the patent statutes there has been described what at present is considered to be the preferred embodiment of the invention, and it will be obvious to those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. A heating and cooling arrangement for a house having an attic and having a roof with eaves overhanging the outer walls thereof comprising a heat pump mounted in the upper portion of an outer wall of said house adjacent said eaves thereof, said heat pump having a first air inlet opening and an outlet opening for circulating outside air through said heat pump, bottom and side walls connected between said eaves and said heat pump to form a duct for directing air from said attic to said heat pump, an opening in said attic for permitting air to flow into the duct, a second inlet opening in said heat pump leading to said duct, and means for closing said outside air inlet opening during winter and for closing said second inlet opening in the summer whereby said heat pump utilizes air from said attic during said winter and outside air during said summer.

2. A heating and cooling arrangement for a house having an attic and having a roof with eaves overhanging the outer walls of said house comprising a heat pump mounted in the upper portion of an outer wall of said house adjacent said eaves thereof, said heat pump having a first air inlet opening and an air outlet opening for circulating outside air through said heat pump, side walls extending between the upper portion of said heat pump and said eaves of said house and a bottom wall extending from the upper portion of said pump and said eaves of said house thereby to form a duct for directing air from said attic to said heat pump, an opening in said duct leading into said attic, a second inlet opening in said heat pump leading into said duct for permitting attic air to flow from said duct into said heat pump, and a damper movable between a first position wherein it closes said first air inlet and a second position wherein it closes said second air inlet whereby said heat pump utilizes air from said attic during said winter and outside air during said summer.

3. A heating and cooling arrangement for a house having an attic and having a roof and rafters overhanging the outer walls of said house to form eaves, comprising a heat pump mounted in the upper portion of an outer wall of said house adjacent said eaves thereof, said heat pump having a first air inlet opening and an air outlet opening in one end thereof for circulating outside air through said heat pump, bottom and side walls connected between at least two adjacent rafters and the top of said heat pump to form a duct between the roof of said house and said heat pump, an opening leading from said duct into said attic between two adjacent rafters for permitting air to flow into said duct, a bottom wall attached to the underside of said two adjacent rafters extending into the uppermost portions of said attic, a second inlet opening in the top of said heat pump for permitting flow of air from said duct into said heat pump, and means for closing said outside air inlet opening during winter and for closing said second inlet opening in the summer whereby said heat pump utilizes air from the uppermost portions of said attic during said winter and outside air during said summer.

No references cited.